April 21, 1959      E. C. BRIGGS      2,883,566
SUBMERSIBLE DYNAMO ELECTRIC MACHINE
Filed Oct. 27, 1955
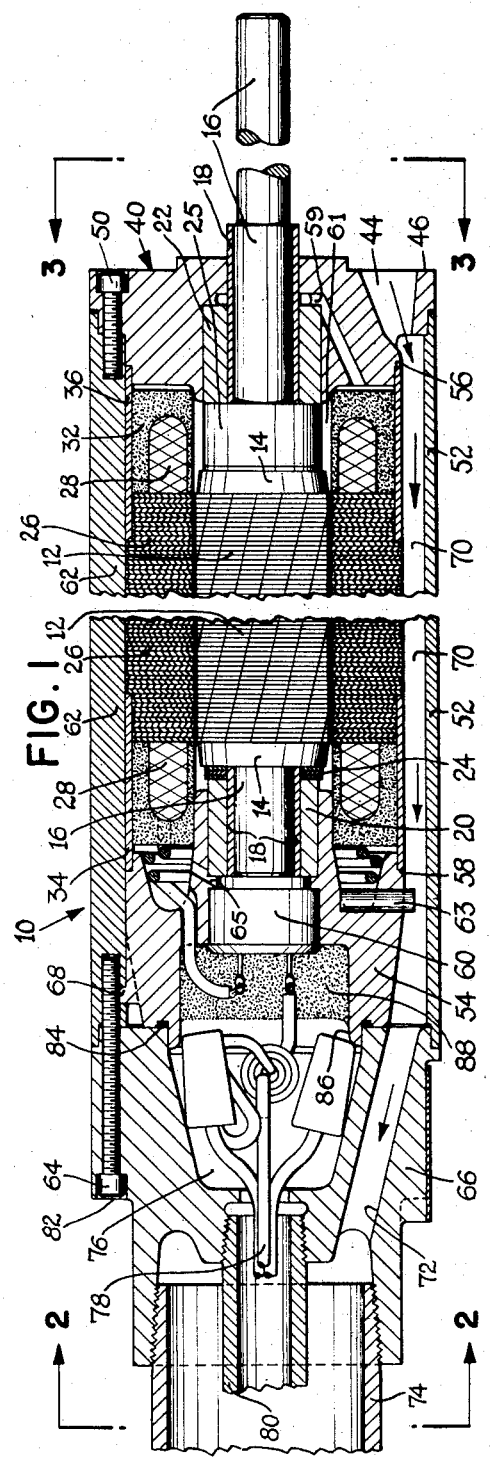
INVENTOR
EUGENE C. BRIGGS
BY
ATTORNEY

United States Patent Office

2,883,566
Patented Apr. 21, 1959

2,883,566

SUBMERSIBLE DYNAMO ELECTRIC MACHINE

Eugene C. Briggs, Dayton, Ohio, assignor to American Machine & Foundry Co., a corporation of New Jersey Application October 27, 1955, Serial No. 543,120

5 Claims. (Cl. 310—87)

This invention relates to submersible pump motor units.

In certain pumping applications it is desirable to place the motor in close association with the pump. When liquids must be pumped from sources, such as buried tanks, it is necessary that the pump motor be submerged along with the pump in order to eliminate the necessity of a long shaft between the two units if the motor were located at or near ground level. Such units are generally used in the gasoline dispensing industry, and have the additional requirement that the unit be located in axial alignment with its associated pump, at the base of the delivery pipe, but the motor itself must be easily detachable from the pump and delivery line in case of motor failure.

Heretofore, a submerged motor for pumping volatile fluids has been completely sealed within an inner shell or casing to prevent the passage of pumped fluid therethrough. The motor casing is generally enclosed within an outer casing to which is attached the pump unit. In this way the pumped fluid passes between the walls of the two casings and into the delivery tube associated therewith. Such arrangements require a number of fluid impervious seals for the various casings in order to overcome the possibility of seepage of the fluid being pumped into the bearings and other internal portions of the motor. With this type of construction, it is usually impossible to remove the motor without breaking all seals and disassembling the motor from the entire motor pump unit.

It is therefore an object of this invention to provide a submersible pump motor which eliminates the need of a separate casing surrounding the motor.

It is a further object of the invention to provide a submersible pump motor in which the fluid being pumped passes through the internal cavities of the motor and directly over its stator walls.

It is another object of the invention to provide a submersible pump motor in which the number of seals is reduced to a minimum.

It is still a further object of the invention to provide a submersible pump motor which may be quickly detached from the pump as a unit without disassembling the motor into its component parts.

Yet another object of the invention is to provide a submersible pump motor adaptable to quick assembly techniques with a minimum number of parts.

For a better understanding of the invention, together with other and further objects thereof, reference is made to the following detailed description taken in connection with the accompanying drawings, in which:

Fig. 1 is a sectional side elevation illustrating the improved pump motor.

Fig. 2 is an end view of the construction of Fig. 1 as viewed from the delivery end thereof.

Fig. 3 is an end view of the motor viewed from the pump end thereof.

Fig. 4 is an enlarged view of the stator laminations shown in section in Fig. 1.

Fig. 5 is an isometric view illustrating in detail the means for locking the motor to its outer housing.

The motor unit generally indicated as 10 includes a rotor 12 which may be of the squirrel cage type, as illustrated, and having end rings 14. The rotor 12 is mounted on a shaft 16 which extends through one end of the motor 10 and is of a length suitable for having pump impellers attached thereto. Each end of shaft 16 has a hardened steel sleeve 18 press-fitted thereon which is in turn rotatably supported by a pair of suitable bearings 20, 22 which may be graphite bearings, for example. Shim washers 24 are provided between end ring 14 and sleeve bearing 20, and a self-aligning thrust washer 25 is provided between sleeve bearing 22 and rotor 12.

A stator core generally indicated as 26, and having a plurality of laminations 30, in which suitable windings 28 are arranged, surrounds rotor 12. The stator is assembled by first arranging the laminations into a stack, adding the windings 28 thereto and next surrounding the ends of the stack with a pair of sleeves 34, 36. The laminations at each end of the stack are of reduced diameter to provide neck portions which will accommodate the sleeves 34, 36, and to provide shoulders against which the inner ends of the sleeves may abut. A strip weld may then be run along the outer walls of the laminations to aid in holding them in assembled relation to each other. The whole assembly 26, including the sleeves 34, 36 is next placed in a suitably shaped mold, and impregnated with a thermosetting adhesive 32 (Fig. 4), such as epoxy resin or other suitable compound, to provide an integrally potted stator assembly. Any of the well known potting techniques may be employed to seal the stator laminations and windings and render them impervious to liquids. It has been found that in a properly potted stator, the sealing compound fully penetrates the interstices between the laminations, thus completely sealing them, as if they had been individually dipped in the impregnating material before welding.

An end shield 40 closes off the pump end of the motor 10 and serves as a support for bearing 22. End shield 40, also shown in Fig. 3, has a plurality of ribs or spokes 42 which define an entrance-way 44 for the passage of pumped fluid forced therethrough by a suitably associated pump. End shield 40 has an annular ring portion 46 with a plurality of threaded bores or apertures 48 located at the junction between spokes 42 and ring 46. A portion of these apertures are utilized for receiving bolts which fasten the casing of a suitably chosen pump, usually of the multiple impeller type, to the motor. The remainder of the apertures are employed to receive screws 50 which securely fasten end shield 40 to an outer sleeve-like casing 52, which, in turn, surrounds the motor components and provides a housing therefor.

The discharge end of motor 10 is closed off by a similar end shield 54 which serves to support bearing 20. The motor 12 and stator 26 are maintained in proper coaxial alignment by end shields 40 and 54, as both end shields 40, 54 have raised shoulders 56, 58, respectively, for mating with stator sleeves 34, 36.

A thermal switch 60, responsive to overheating of bearing 20 or stator windings 28, for de-energizing the motor is mounted in end shield 54 in axial alignment with shaft 16. As the stator windings are completely impervious to the pumped fluid, it is utilized as a lubricant and cooling medium for sleeve bearings 20, 22. Fluid seeping between shaft 16 and bearing 22 flows through a duct 59 into the internal rotor cavity 61 of motor 10, and passes back into the main fluid stream through a porous vent 63 which communicates with cavity 61. A portion of the fluid also lubricates bearing 20 by flowing from cavity 61 through channel 65 in end shield 54. If desired, two or more channels may be provided, according to bearing lubrication requirements.

Casing 52 has a number of inwardly extending ribs 62 which abut the stator walls so as to add mechanical strength and support to the stator arrangement. A portion of ribs 62 have threaded holes 67 for receiving clamping bolts 64 which serve to fasten securely an adaptor housing 66 to the motor 10. The adaptor housing provides a means for connecting a delivery pipe of any selected diameter to the motor 10.

End shield 54 has a plurality of outwardly extending lugs 68 which engage bayonet lock-type slots 69 in ribs 62, shown in more detail in Fig. 5. Ribs 62 extend the entire length of housing 52 and further serve to increase pumping efficiency by eliminating turbulence in the fluid which may have been created by the action of an impeller in the pump attached to end shield 40. The space between ribs 62 taken in connection with the outer walls of the stator 26 defines a passageway 70 for passing fluid therethrough.

Adaptor housing 66 has a passageway which communicates with the passageway 70 for conducting the pumped fluid into a delivery pipe 74 which is suitably attached to housing 66. An inner recess 76 in housing 66, in cooperation with a corresponding recess 86 in end shield 54, defines a cavity for receiving the various connections between electrical power conductors 78 and the windings of motor 10. A conduit 80 for the leads 78 is concentrically mounted with respect to delivery pipe 74 in adaptor housing 66, which in turn is attached to motor 10 by means of through-bolts 64 which pass through apertures in shoulder 82 or housing 66 and engage the threads in apertures 67 of casing 52. A suitable O ring seal 84, impervious to the liquid which the motor is adapted to pump, is positioned between housing 66 and end shield 54 to prevent leakage of the pump fluid into the cavity 76. To prevent any possibility of fluid reaching the wiring connections in cavity 76, recessed portion 86 of end shield 54 is filled with a suitable impregnating or potting compound 88.

To assemble the motor, the rotor 16, potted stator 26 and end shields 40 and 54 are first arranged in cooperative engagement with each other. Then these assembled components are slid into casing 52 with the bayonet lug 68 passing freely between ribs 62 until the bayonet slots 69 therein are reached. By simply twisting the subassembly the end shield 54 is locked into place. Tightening of screws 50 will then place the outer casing 52 into tension and the laminations into compression, a highly desirable state, whereupon the whole motor can now be operated since all of its essential components are rigidly locked into place. The entire assembly is completely by attaching the adaptor housing 66 to end shield member 54 by means of bolts 82. A passageway for pumped fluid is thus defined by fluid passing through entrance 44 into passage 70 and thence out into the conduit pipe through passage 72. It will be noted that the main portion of the pumped fluid passes directly in contact with the impregnated outer walls of stator 26, while that portion which seeps between bearing 22 and sleeve 18 contacts the inner walls of the stator 26 and walls of rotor 12. It should be further noted that a compact pump motor assembly has been achieved with a minimum number of parts and a minimum number of fastening devices. For example, in the illustrated embodiment, only three screws are needed to hold the entire motor in operative alignment.

While the present invention has been disclosed by means of specific illustrative embodiments thereof, it would be obvious to those skilled in the art that various changes and modifications in the means of operation described or in the apparatus may be made without departing from the spirit of the invention as defined in the appended claims.

I claim:

1. A submersible pump motor comprising a shaft, a rotor on said shaft, a stator member surrounding said rotor, a sleeve member abutting each end of said rotor, a pair of end shield members engaging said sleeve members and adapted to hold said motor in assembled relation, a housing surrounding said stator, said housing having a plurality of inwardly extending longitudinal ribs to space said housing from said stator and define a passageway for conducting fluids therethrough in direct contact with said stator, said ribs having slots near one end, and locking means for removably holding said end shields to said housing, said locking means including outwardly extending lugs on one of said end shields, said lugs being adapted to engage with said slots in said ribs when said motor is in assembled relationship.

2. The invention defined in claim 1 including an adaptor housing abutting the end shield member positioned by said locking lugs, said adaptor housing having an opening for discharging the main portion of the fluid pumped by said motor, said opening communicating with said passageway, and separate clamping means extending between said adaptor housing and said housing surrounding said stator and engaging the ends of said ribs for removably attaching said adaptor housing to said motor assembly.

3. A submersible pump motor comprising a shaft, a rotor on said shaft, a stator member surrounding said rotor, a sleeve member abutting each end of said rotor, a pair of end shield members engaging said sleeve members and adapted to hold said motor in assembled relation, a housing surrounding said stator, said housing having a plurality of inwardly extending longitudinal ribs to space said housing from said stator and define a passageway for conducting fluids therethrough in direct contact with said stator, said ribs having slots near one end thereof and longitudinal bores in one end of said ribs remote from said first named end, said locking means including outwardly extending lugs on a first one of said end shield members and a plurality of through-bolts extending between a second one of said end shield members to rigidly interconnect said second end shield member with said housing, said lugs being adapted to engage with said slots in said ribs when said motor is in assembled relationship.

4. A submersible pump motor for pumping volatile fluids therethrough comprising a shaft, a rotor on said shaft, a cylindrical stator member surrounding said rotor and having a plurality of laminations with windings arranged thereon, the end portions of said windings extending outwardly from each end of said stator member, said stator member having a shoulder portion circumferentially disposed near each end thereof and a neck portion of reduced diameter extending between each of said shoulders and each end of said stator, a sleeve member surrounding each of said neck portions and encasing said outwardly extending ends of said windings, impregnating material covering said windings and said laminations and substantially filling said sleeve member to form said windings, laminations and said sleeve members into an integrally cast stator assembly, an outer housing for said motor surrounding said stator assembly and spaced therefrom to define a passageway for conducting therethrough the main portion of fluid pumped by said motor, said fluid passing through said passageway in direct contact with said laminations, a pair of end shield members abutting the ends of said housing and said sleeve members and adapted to hold said rotor and said stator in assembled relationship, and clamping means extending between said end shield members and said housing walls and operative to apply a compressive force to said laminations to hold said assembly in rigid assembled relationship.

5. A submersible pump motor for pumping volatile fluids therethrough comprising a shaft, a rotor on said shaft, a cylindrical stator member surrounding said rotor and having a plurality of laminations with windings arranged thereon, the end portions of said windings extending outwardly from each end of said stator member, said stator member having a shoulder portion circumferentially disposed near each end thereof and a neck portion of reduced diameter extending between each of said shoulders and each end of said stator, a sleeve member surrounding each of said neck portions and encasing said outwardly extending ends of said windings, impregnating material covering said windings and said laminations and substantially filling said sleeve member to form said windings, laminations and said sleeve members into an integrally cast stator assembly, an outer housing for said motor surrounding said stator assembly and spaced therefrom to define a passageway for conducting therethrough the main portion of fluid pumped by said motor, said fluid passing through said passageway in direct contact with said laminations, said housing having a plurality of inwardly extending longitudinal ribs axially aligned with said rotor to space said housing from said potted laminations, a pair of end shield members abutting the ends of said housing and said sleeve members and adapted to hold said rotor and said stator in assembled relationship and clamping members extending between said end shield members and engaging the ends of said ribs and operative to apply a tensive force to said ribs and said housing and a compressive force to said laminations to hold said assembly in rigid assembled relationship.

References Cited in the file of this patent

UNITED STATES PATENTS

| | | |
|---|---|---|
| 1,427,974 | Sessions | Sept. 5, 1922 |
| 2,043,236 | Conant | June 9, 1936 |
| 2,246,751 | Nelson | June 24, 1941 |
| 2,261,915 | Korte et al. | Nov. 4, 1941 |
| 2,279,014 | Sawyer | Apr. 7, 1942 |
| 2,568,548 | Howard et al. | Sept. 18, 1951 |
| 2,594,096 | Trigg | Apr. 22, 1952 |
| 2,602,785 | Wiles et al. | July 8, 1952 |
| 2,735,950 | Brown | Feb. 21, 1956 |
| 2,736,825 | Hill | Feb. 28, 1956 |
| 2,761,078 | McAdam | Aug. 28, 1956 |

FOREIGN PATENTS

| | | |
|---|---|---|
| 253,538 | Great Britain | Dec. 9, 1936 |
| 628,541 | Germany | Apr. 6, 1936 |

UNITED STATES PATENT OFFICE

CERTIFICATE OF CORRECTION

Patent No. 2,883,566　　　　　　　　　　　　　　　　　　　　April 21, 1959

Eugene C. Briggs

It is hereby certified that error appears in the printed specification of the above numbered patent requiring correction and that the said Letters Patent should read as corrected below.

Column 4, lines 73 to 75, for "ex- said stator member having a shoulder portion circum-tending outwardly from each end of said stator member," read -- extending outwardly from each end of said stator member, said stator member having a shoulder portion circum- --.

Signed and sealed this 18th day of August 1959.

(SEAL)

Attest:

KARL H. AXLINE　　　　　　　　　　　　　　　　　　　　　　　　ROBERT C. WATSON
Attesting Officer　　　　　　　　　　　　　　　　　　　　　　　Commissioner of Patents